United States Patent
Oya et al.

(10) Patent No.: US 12,497,092 B2
(45) Date of Patent: Dec. 16, 2025

(54) STEERING CONTROL DEVICE AND STEERING CONTROL METHOD

(71) Applicant: JTEKT CORPORATION, Kariya (JP)

(72) Inventors: Toshiaki Oya, Sakai (JP); Yoshinobu Shimizu, Sakai (JP)

(73) Assignee: JTEKT CORPORATION, Kariya (JP)

( * ) Notice: Subject to any disclaimer, the term of this patent is extended or adjusted under 35 U.S.C. 154(b) by 28 days.

(21) Appl. No.: 18/730,570

(22) PCT Filed: Feb. 7, 2022

(86) PCT No.: PCT/JP2022/004659
§ 371 (c)(1),
(2) Date: Jul. 19, 2024

(87) PCT Pub. No.: WO2023/148962
PCT Pub. Date: Aug. 10, 2023

(65) Prior Publication Data
US 2025/0100612 A1 Mar. 27, 2025

(51) Int. Cl.
*B62D 1/00* (2006.01)
*B62D 1/28* (2006.01)
*B62D 15/02* (2006.01)

(52) U.S. Cl.
CPC ........... *B62D 1/286* (2013.01); *B62D 15/025* (2013.01)

(58) Field of Classification Search
CPC .............................. B62D 1/286; B62D 15/025
See application file for complete search history.

(56) References Cited

U.S. PATENT DOCUMENTS 11,731,644 B1 * 8/2023 Stark .................... B60W 50/10
701/23
2018/0154932 A1 6/2018 Rakouth et al.
(Continued)

FOREIGN PATENT DOCUMENTS

JP H08-34353 A 2/1996
JP 2004-224238 A 8/2004
(Continued)

OTHER PUBLICATIONS

Apr. 11, 2025 Search Report issued in European Patent Application No. 22924592.3.
(Continued)

*Primary Examiner* — Phutthiwat Wongwian
*Assistant Examiner* — Sherman D Manley
(74) *Attorney, Agent, or Firm* — Oliff PLC

(57) ABSTRACT

A steering control device includes: a target steering corresponding value calculation unit that calculates a target steering corresponding value so that the ratio of the amount of change in steered angle to the amount of change in amount of operation of an operating member becomes greater than 1; a control signal generation unit that generates a control signal; and a mode switch unit that switches a control mode. The mode switch unit performs: an operation determination process of determining whether an operation condition for detecting a valid operation performed on the operating member by a driver is satisfied during an autonomous driving control mode; and a mode switching process of switching the control mode to a manual driving control mode when the operation condition is satisfied. The operation determination process includes a process of determining an unintended operation by the driver to be invalid.

9 Claims, 5 Drawing Sheets

(56) References Cited

U.S. PATENT DOCUMENTS

| | | | |
|---|---|---|---|
| 2018/0304920 A1 | 10/2018 | Hirate et al. | |
| 2019/0202494 A1 | 7/2019 | Itou et al. | |
| 2021/0053613 A1 | 2/2021 | Kodera et al. | |
| 2021/0309292 A1 | 10/2021 | Suzuki | |
| 2024/0343260 A1* | 10/2024 | Kunihiro | B60W 60/001 |
| 2024/0343302 A1* | 10/2024 | Kunihiro | B62D 6/008 |

FOREIGN PATENT DOCUMENTS

| | | |
|---|---|---|
| JP | 2009-208551 A | 9/2009 |
| JP | 2018-177152 A | 11/2018 |
| JP | 2021-030837 A | 3/2021 |
| WO | 2017/199575 A1 | 11/2017 |
| WO | 2020/031294 A1 | 2/2020 |

OTHER PUBLICATIONS

Apr. 26, 2022 Search Report issued in International Patent Application No. PCT/JP2022/004659.

* cited by examiner

STEERING CONTROL DEVICE AND STEERING CONTROL METHOD

CROSS-REFERENCE TO RELATED APPLICATIONS

This application is national stage application of International Application No. PCT/JP2022/004659, filed on Feb. 7, 2022, which designates the United States, the entire contents of which are incorporated herein by reference.

TECHNICAL FIELD

The present disclosure relates to steering control devices and steering control methods.

BACKGROUND ART

Conventionally, there is a steer-by-wire steering system in which a power transmission path between an operation unit to which a steering wheel is connected and a steering unit that steers steered wheels is separated. For example, as described in Patent Document 1, a steering control device that controls such a steering system changes the angle ratio of the steered angle of the steered wheels to the steering angle of the steering wheel according to the traveling condition of a vehicle.

Patent Document 2 discloses a configuration in which, in addition to or instead of a steering wheel, a joystick is used as an operating member to be operated by a driver. When the joystick is an operating member, the amount of operation necessary to steer the steered wheels can be reduced compared to when the steering wheel is an operating member, which can improve driver convenience.

RELATED ART DOCUMENTS

Patent Documents

Patent Document 1: Japanese Unexamined Patent Application Publication No. 2021-30837 (JP 2021-30837 A)
Patent Document 2: Japanese Unexamined Patent Application Publication No. 8-34353 (JP 8-34353 A)

SUMMARY OF THE INVENTION

Problem to be Solved by the Invention

As described above, when the joystick is an operating member, the amount of operation necessary to steer the steered wheels is reduced. Therefore, the amount of change in steered angle relative to the amount of change in amount of operation increases accordingly. That is, even when the amount of operation of the joystick is small, the steered angle of the steered wheels changes greatly. It is therefore necessary to make the operation of the joystick valid even when the amount of operation of the joystick is small. In this case, for example, when the driver unintentionally touches the joystick, this unintended operation by the driver may become valid. This problem occurs not only when the joystick is an operating member. This problem may also occur in any steering system in which the amount of change in steered angle relative to the amount of change in amount of operation of the operating member is large.

Means for Solving the Problem

One aspect of the present disclosure provides a steering control device that controls a steering system of a vehicle. The steering system has a structure in which a power transmission path between an operation unit including an operating member and a steering unit configured to steer a steered wheel is separated. The steering control device includes: a target steering corresponding value calculation unit configured to calculate, based on an operation of the operating member, a target steering corresponding value that is a target value of a convertible value that is convertible into a steered angle of the steered wheel, and to calculate the target steering corresponding value in such a manner that a ratio of an amount of change in the steered angle to an amount of change in an amount of operation of the operating member becomes greater than 1; a control signal generation unit configured to generate, based on the target steering corresponding value, a control signal for activating the steering unit; and a mode switch unit that switches a control mode in which the steering unit is activated to an autonomous driving control mode or a manual driving control mode. The vehicle includes an external control device that outputs an autonomous driving instruction to implement autonomous driving for autonomously changing a direction of travel of the vehicle. The autonomous driving control mode is a mode in which the autonomous driving instruction is reflected in a control for activating the steering unit. The manual driving control mode is a mode in which the autonomous driving instruction is not reflected in the control for activating the steering unit. The mode switch unit performs: an operation determination process of determining whether an operation condition for detecting a valid operation performed on the operating member by a driver is satisfied during the autonomous driving control mode; and a mode switching process of switching the control mode from the autonomous driving control mode to the manual driving control mode when the operation condition is satisfied. The operation determination process includes a process of determining an unintended operation by the driver to be invalid.

Another aspect of the present disclosure provides a steering control method for controlling a steering system of a vehicle. The steering system has a structure in which a power transmission path between an operation unit including an operating member and a steering unit configured to steer a steered wheel is separated. The steering control method includes: calculating, based on an operation of the operating member, a target steering corresponding value that is a target value of a convertible value that is convertible into a steered angle of the steered wheel, and calculating the target steering corresponding value in such a manner that a ratio of an amount of change in the steered angle to an amount of change in an amount of operation of the operating member becomes greater than 1; generating, based on the target steering corresponding value, a control signal for activating the steering unit; and switching a control mode in which the steering unit is activated to an autonomous driving control mode or a manual driving control mode. The vehicle includes an external control device that outputs an autonomous driving instruction to implement autonomous driving for autonomously changing a direction of travel of the vehicle. The autonomous driving control mode is a mode in which the autonomous driving instruction is reflected in a control for activating the steering unit. The manual driving control mode is a mode in which the autonomous driving instruction is not reflected in the control for activating the steering unit. Switching the control mode includes: an operation determination process of determining whether an operation condition for detecting a valid operation performed on the operating member by a driver is satisfied during the autonomous driving control mode; and a mode switching process of switching the control mode from the autonomous driving control mode to the manual driving control mode when the operation condition is satisfied. The operation determination process includes a process of determining an unintended operation by the driver to be invalid.

MODES FOR CARRYING OUT THE INVENTION

First Embodiment

A first embodiment of a steering control device will be described below with reference to the drawings.
(Overall Configuration)

Figure 1:
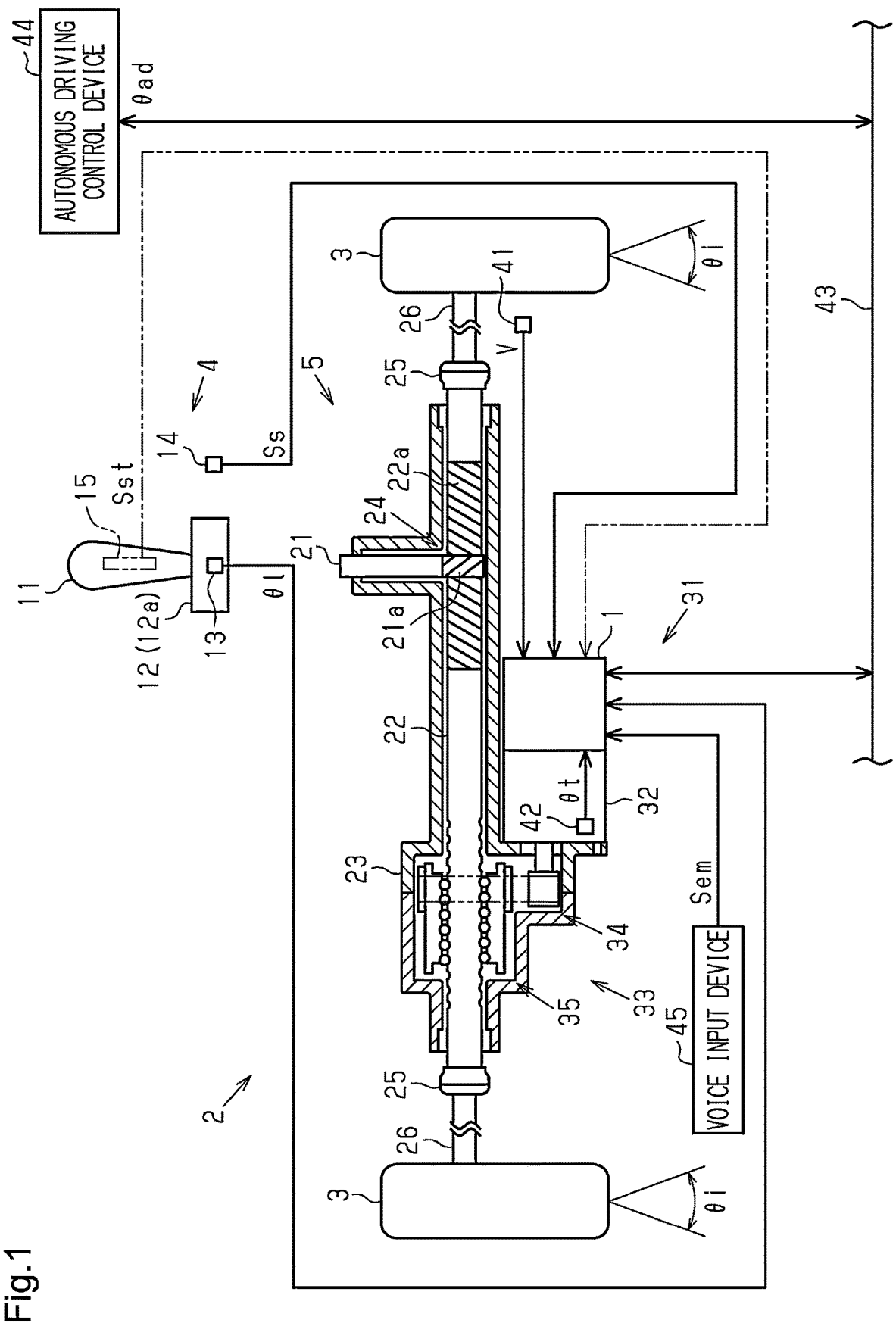
FIG. 1 is a schematic configuration diagram of a steering system and a steering control device that controls the steering system according to a first embodiment.

As shown in FIG. 1, a steering control device 1 controls a steer-by-wire steering system 2. The steering system 2 changes the direction of travel of a vehicle by steering steered wheels 3 according to an operation by a driver. The steering system 2 includes an operation unit 4 that is operated by the driver, and a steering unit 5 that steers the steered wheels 3. The steering system 2 has a structure in which a power transmission path between the operation unit 4 and the steering unit 5 is mechanically separated.

The operation unit 4 includes an operating lever 11 that is operated by the driver, and a base 12 that tiltably supports the operating lever 11. The base 12 of the present embodiment supports the operating lever 11 in such a manner that the operating lever 11 is tiltable in a lateral direction of the vehicle, i.e., in a left-right direction, and the operating lever 11 is tilted in the left-right direction by an operation by the driver. That is, the amount of operation by the driver is represented by the tilt angle of the operating lever 11 (hereinafter referred to as lever tilt angle θl). In another embodiment, the base 12 may support the operating lever 11 in such a manner that the operating lever 11 is tiltable in a front-rear direction of the vehicle.

In the illustrated example, the operation unit 4 includes a tilt angle sensor 13 that detects the lever tilt angle θl. The lever tilt angle θl is detected as a positive value when the operating lever 11 is tilted to the right, and as a negative value when the operating lever 11 is tilted to the left, but this may be opposite.

The operation unit 4 further includes a reaction force mechanism 12a that applies an operation reaction force that is a force against the operation of the operating lever 11 by the driver. For example, the reaction force mechanism 12a is composed of a motor and/or a spring that generates an operation reaction force to be applied to the operating lever 11. When no force is applied to the operating lever 11 by the driver, the reaction force mechanism 12a applies an operation reaction force for maintaining the operating lever 11 in a straight ahead position. The straight ahead position is a position corresponding to the state in which the vehicle travels straight. When the driver applies a force to the operating lever 11 to the extent that the position of the operating lever 11 no longer matches the straight ahead position, and then stops applying the force thereto, the reaction force mechanism 12a applies an operation reaction force for the operating lever 11 to return to the straight ahead position.

The operation unit 4 further includes an operation invalid switch 14 that is operated by the driver. The operation invalid switch 14 is used to make any operation of the operating lever 11 by the driver invalid, as will be described later. Making any operation of the operating lever 11 invalid means that even when the driver operates the operating lever 11, this operation will not be reflected in the control of the steering system 2. The operation invalid switch 14 outputs operation invalid switch information Ss indicating the on/off state of the operation invalid switch 14 to the steering control device 1. The operation invalid switch 14 of the present embodiment is a type of switch that is switched to the continuous on or off state every time the driver presses the operation invalid switch 14. The operation invalid switch 14 is mounted on, for example, the operating lever 11. However, the operation invalid switch 14 is not limited to this, and may be disposed at any position where the operation invalid switch 14 is operable by the driver, such as on the base 12 or near a driver's seat. In the following description, the "lever operation" refers to an operation of the operating lever 11 by the driver.

The steering unit 5 includes a pinion shaft 21, a rack shaft 22 connected to the pinion shaft 21, a rack housing 23 that reciprocatably houses the rack shaft 22, and a rack and pinion mechanism 24 having the pinion shaft 21 and the rack shaft 22. The rack and pinion mechanism 24 is configured by meshing pinion teeth 21a formed on the pinion shaft 21 with rack teeth 22a formed on the rack shaft 22. The pinion shaft 21 therefore rotates according to the reciprocating motion of the rack shaft 22. Tie rods 26 are connected to both ends of the rack shaft 22 via ball joints 25. Distal ends of the tie rods 26 are connected to knuckles, not shown, with the steered wheels 3 attached thereto.

The steering unit 5 further includes a steering actuator 31 that applies a steering force, namely a force for steering the steered wheels 3, to the rack shaft 22. In the illustrated example, the steering actuator 31 includes a steering motor 32 and a power transmission mechanism 33 that transmits torque of the steering motor 32 to the rack shaft 22. The power transmission mechanism 33 includes a belt mechanism 34 and a ball screw mechanism 35. The steering actuator 31 transmits rotation of the steering motor 32 to the ball screw mechanism 35 via the belt mechanism 34, and the ball screw mechanism 35 converts the rotation into a reciprocating motion of the rack shaft 22. The steering actuator 31 thus applies a steering force to the steered wheels 3.

In the steering system 2 configured as described above, a steering force is applied from the steering actuator 31 according to the lever operation. As a result, the rack shaft 22 reciprocates, and the steered angle θi of the steered wheels 3 is changed. That is, the steering actuator 31 steers the steered wheels 3 according to the lever operation.

The steering control device 1 is connected to the steering motor 32 and controls activation of the steering motor 32. Detection results from various sensors are input to the steering control device 1. The various sensors include, for example, the tilt angle sensor 13, a vehicle speed sensor 41, and a rotation angle sensor 42. The vehicle speed sensor 41 detects a vehicle speed V that is a travel speed of the vehicle. The rotation angle sensor 42 detects a rotation angle θt of a rotating shaft of the steering motor 32 as a relative angle within the range of 360°. The operation invalid switch information Ss from the operation invalid switch 14 is also input to the steering control device 1. The detection results of these various sensors are examples of state variables. The steering control device 1 controls activation of the steering motor 32 based on the received state variables.

An autonomous driving control device 44 is also connected to the steering control device 1 via an in-vehicle network 43 such as a CAN. The autonomous driving control device 44 is an external control device provided separately from the steering control device 1 in the vehicle equipped with the steering system 2. The autonomous driving control device 44 controls activation of the steering unit 5 to autonomously change the direction of travel of the vehicle. The autonomous driving control device 44 obtains an optimal control method based on the current state of the vehicle. The autonomous driving control device 44 controls activation of the steering unit 5 according to the obtained control method. For example, the autonomous driving control device 44 instructs to change the steered angle θi of the steered wheels 3 so as to take over driving while the vehicle is traveling.

The autonomous driving control device 44 calculates an autonomous driving controlled variable θad as a controlled variable for instructing to change the steered angle θi of the steered wheels 3. The autonomous driving controlled variable θad corresponds to an instruction for autonomous driving defined by an angle. Various detection devices, not shown, for detecting the state of the vehicle are connected to the autonomous driving control device 44. For example, the various detection devices include cameras and sensors for lane perception. The autonomous driving control device 44 calculates the autonomous driving controlled variable θad for autonomous driving to be implemented, based on the state of the vehicle detected through the above detection devices. The autonomous driving controlled variable θad is a controlled variable for instructing to change the steered angle θi of the steered wheels 3 in order to change the direction of travel in which the vehicle travels, regardless of the lever operation. The autonomous driving controlled variable θad is output to the steering control device 1. The autonomous driving control device 44 determines whether to implement autonomous driving, based on a request from the driver through, for example, a switch operation, not shown. The autonomous driving control device 44 need only be configured to output the autonomous driving controlled variable θad to the steering control device 1 when implementing autonomous driving based on a request from the driver. The autonomous driving control device 44 may calculate the autonomous driving controlled variable θad regardless of whether to implement autonomous driving. The autonomous driving control device 44 configured in this manner need only not output the autonomous driving controlled variable θad to the steering control device 1 when not implementing autonomous driving.

A voice input device 45 that detects the voice of the driver is also connected to the steering control device 1. The voice input device 45 is used to cancel autonomous driving while the autonomous driving is in operation. The voice input device 45 is a request means separate from the above switch operation that is performed to cancel autonomous driving while the autonomous driving is in operation. The voice input device 45 outputs a detection signal Sem indicating the detection result of the driver's voice to the steering control device 1. The voice input device 45 of the present embodiment is mounted on, for example, the operating lever 11. However, the voice input device 45 is not limited to this, and may be disposed at any position where the driver's voice is detectable, such as on the base 12 or near the driver's seat.

(Steering Control Device 1)

Figure 2:
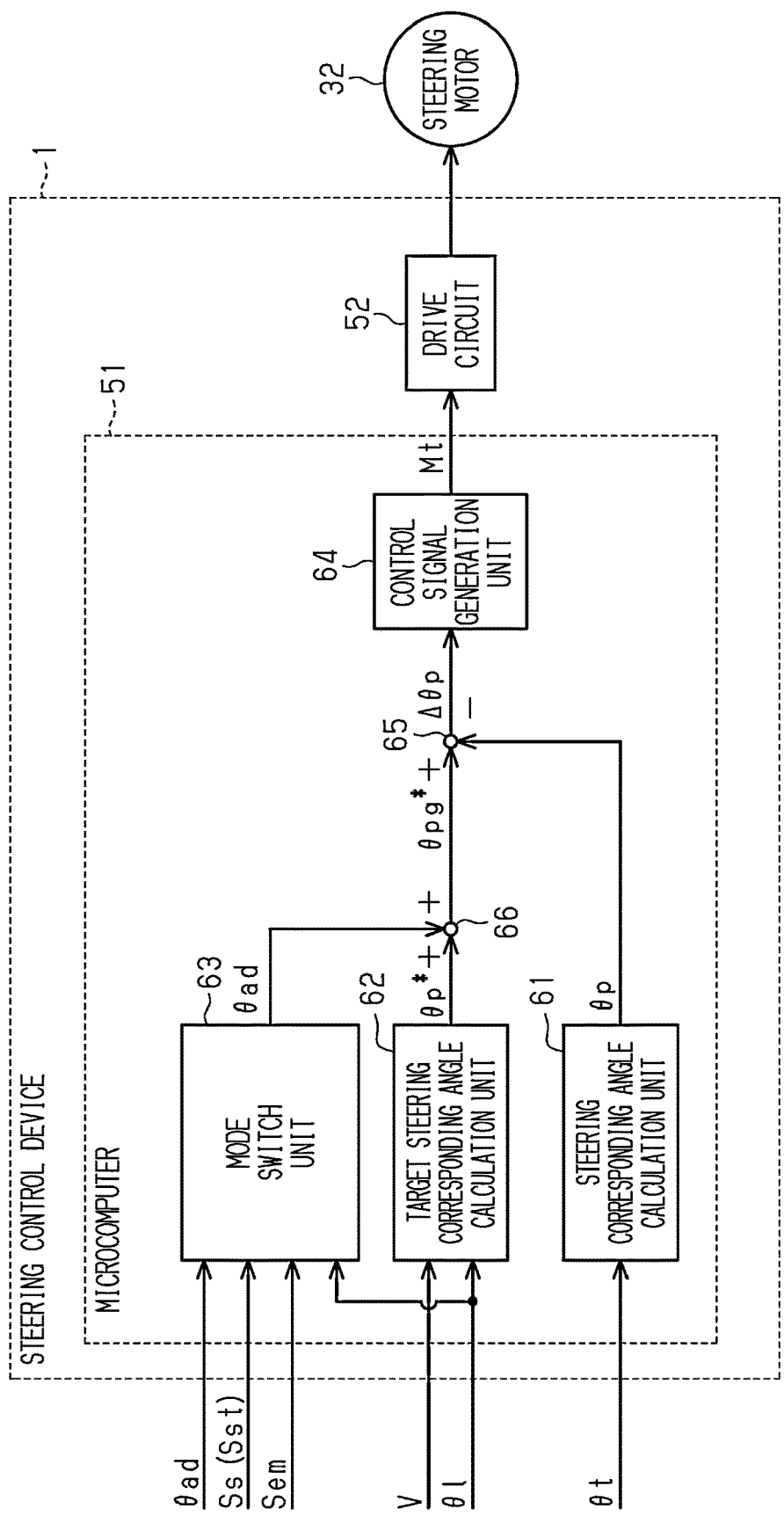
FIG. 2 is a block diagram of the steering control device in FIG. 1.

The configuration of the steering control device 1 will be described in detail below. As shown in FIG. 2, the steering control device 1 includes a microcomputer 51 that outputs a control signal Mt, and a drive circuit 52 that supplies electric power to the steering motor 32 based on the control signal Mt.

The microcomputer 51 that is a processing circuit can be composed of (1) one or more processors that operate according to a computer program (software), (2) one or more dedicated hardware circuits such as an application-specific integrated circuit (ASIC) that perform at least part of various processes, or (3) a combination thereof. The processor includes a CPU and a memory such as RAM and ROM, and the memory stores program codes or commands configured to cause the CPU to perform processes. The memory, namely a non-transitory computer-readable medium, includes any available media that can be accessed by a general purpose or special purpose computer. Various controls by the microcomputer 51 are performed by the CPU executing programs stored in the memory at a predetermined calculation cycle.

A typical PWM inverter including a plurality of switching elements such as, for example, FETs or IGBTs is used as the drive circuit 52. The control signal Mt is a gate on/off signal that defines the on/off state of each switching element.

The microcomputer 51 outputs the control signal Mt to the drive circuit 52, so that electric power according to the control signal Mt is supplied from an in-vehicle power supply to the steering motor 32. As a result, the steering motor 32 rotates, and a steering force is applied to the steered wheels 3 as described above. In this way, the steering control device 1 supplies electric power to the steering motor 32 to control motor torque generated by the steering motor 32, thereby steering the steered wheels 3.

(Microcomputer 51)

The configuration of the microcomputer 51 will be described in detail below. The microcomputer 51 outputs the control signal Mt by the following control blocks performing arithmetic processing at a predetermined calculation cycle. The vehicle speed V, the lever tilt angle θl, the rotation angle θt, the operation invalid switch information Ss, the detection signal Sem, and the autonomous driving controlled variable θad are input to the microcomputer 51. The microcomputer 51 generates and outputs the control signal Mt based on these state variables.

Specifically, the microcomputer 51 includes a steering corresponding angle calculation unit 61 that calculates a steering corresponding angle θp, a target steering corresponding angle calculation unit 62 that calculates a target steering corresponding angle θp* that is a target value of the steering corresponding angle θp, a mode switch unit 63 that switches a control mode regarding whether to implement autonomous driving, and a control signal generation unit 64 that generates the control signal Mt.

The rotation angle θt of the steering motor 32 is input to the steering corresponding angle calculation unit 61. The steering corresponding angle calculation unit 61 calculates an integrated angle by counting the number of rotations of the steering motor 32 from, for example, a midpoint and integrating the rotational angle θt with the midpoint as zero degrees. The steering corresponding angle calculation unit 61 then obtains the steering corresponding angle θp by multiplying this integrated angle by a conversion factor based on the reduction ratio of the belt mechanism 34, the lead of the ball screw mechanism 35, and the rotational speed ratio of the rack and pinion mechanism 24. That is, the steering corresponding angle θp corresponds to a pinion angle that is the rotation angle of the pinion shaft 21, and the midpoint is the rotation angle of the pinion shaft 21 when the vehicle travels straight. As described above, the pinion shaft 21 rotates according to the reciprocating motion of the rack shaft 22. Therefore, the rotational angle of the pinion shaft 21, i.e., the steering corresponding angle θp, corresponds to a steering corresponding value that is an actual value of a convertible value that can be converted into the steered angle θi of the steered wheels 3, and the steering corresponding angle calculation unit 61 corresponds to a steering corresponding value calculation unit. The steering corresponding angle θp calculated by the steering corresponding angle calculation unit 61 is output to the control signal generation unit 64 via a subtractor 65.

The vehicle speed V and the lever tilt angle θl are input to the target steering corresponding angle calculation unit 62. The target steering corresponding angle calculation unit 62 calculates the target steering corresponding angle θp*, namely is a target value of the steering corresponding angle θp, based on these state variables. The target steering corresponding angle calculation unit 62 calculates the target steering corresponding angle θp* so as to change the angle ratio α of the steered angle θi of the steered wheels 3 to the lever tilt angle θl of the operating lever 11. The angle ratio α is a value obtained by dividing the steered angle θi by the lever tilt angle θl (α=θi/θl). The angle ratio α is set to be greater than 1, and is set so that the absolute value of the target steering corresponding angle θp* increases as the absolute value of the lever tilt angle θl increases. The angle ratio α may be a value obtained by dividing the target steering corresponding angle θp* by the lever tilt angle θl. This is because the steered angle θi is a state variable obtained as a result of being controlled by the target steering corresponding angle θp* and therefore has a correlation with the target steering corresponding angle θp*. The angle ratio α is set so that the absolute value of the target steering corresponding angle θp* increases as the vehicle speed V decreases. In the present embodiment, the target steering corresponding angle θp* corresponds to a target steering corresponding value that is a target value of a convertible value that can be converted into the steered angle θi of the steered wheels 3, and the target steering corresponding angle calculation unit 62 corresponds to a target steering corresponding value calculation unit. The arithmetic process of calculating the target steering corresponding angle θp* by the target steering corresponding angle calculation unit 62 will be described later. The target steering corresponding angle θp* is output to the control signal generation unit 64 via the subtractor 65 and an adder 66.

The lever tilt angle θl, the operation invalid switch information Ss, the detection signal Sem, and the autonomous driving controlled variable θad are input to the mode switch unit 63. The mode switch unit 63 determines, based on these state variables, whether to implement autonomous driving according to the autonomous driving controlled variable θad.

When the mode switch unit 63 determines to implement autonomous driving, the mode switch unit 63 switches the control mode to an autonomous driving control mode. In the autonomous driving control mode, the steering unit 5 is controlled so that the autonomous driving controlled variable θad is reflected in the steered angle θi. When the control mode is switched to the autonomous driving control mode, the autonomous driving controlled variable θad is output to the adder 66. In this case, the target steering corresponding angle θp* and the autonomous driving controlled variable θad are input to the adder 66. The adder 66 adds the target steering corresponding angle θp* and the autonomous driving controlled variable θad to calculate a target steering corresponding angle θpg* as a target value for the autonomous driving control mode.

On the other hand, when the mode switch unit 63 determines not to implement autonomous driving, the mode switch unit 63 switches the control mode to a manual driving control mode. In the manual driving control mode, the steering unit 5 is controlled so that the autonomous driving controlled variable θad is not reflected in the steered angle θi. When the control mode is switched to the manual driving control mode, the autonomous driving controlled variable θad is not output to the adder 66. In this case, the target steering corresponding angle θp* is input to the adder 66. The adder 66 uses the target steering corresponding angle θp* as it is to calculate a target steering corresponding angle θpg* as a target value for the manual driving control mode. The target steering corresponding angle θpg* calculated by the adder 66 is output to the subtractor 65. The subtractor 65 subtracts the steering corresponding angle θp from the target steering corresponding angle θpg* to calculate a deviation Δθp, and outputs the deviation 40p to the control signal generation unit 64.

The deviation Δθp is input to the control signal generation unit 64. The control signal generation unit 64 generates the control signal Mt based on this state variable. The control signal generation unit 64 performs an F/B calculation based on the deviation Δθp to calculate target steering torque. As an example, a PID control calculation is used for the F/B calculation. However, the F/B calculation is not limited to this, and a PI control calculation etc. may be used. An F/B control unit then uses a desired known technique to generate the control signal Mt that causes the steering motor 32 to generate the target steering torque.

(Mode Switch Unit 63)

A control mode switching process that is performed by the mode switch unit 63 will be described in detail. The mode switch unit 63 performs an operation determination process of determining whether operation conditions for detecting a valid lever operation are satisfied during the autonomous driving control mode. As will be described later, the operation conditions are conditions for determining whether it is a situation where the autonomous driving control mode should be cancelled and switched to the manual driving control mode. The operation conditions are set from the viewpoint that the lever operation can be detected as an intended operation by the driver. That is, when the operation conditions are not satisfied, the lever operation is detected as an unintended operation by the driver. From the viewpoint of determining whether it is a situation where the autonomous driving control mode should be cancelled and switched to the manual driving control mode, an unintended operation by the driver that is detected as an operation for which the operation conditions are not satisfied is determined to be invalid so as to be excluded from the determination.

When the autonomous driving controlled variable θad is input from the autonomous driving control device 44 to the mode switch unit 63, the mode switch unit 63 performs a process of switching the control mode to the autonomous driving control mode. When the autonomous driving controlled variable θad is no longer input to the mode switch unit 63 or the operation conditions are satisfied during the autonomous driving control mode, the mode switch unit 63 cancels the autonomous driving control mode and switches the control mode to the manual driving control mode. Similarly, when a voice input provided by the driver to cancel autonomous driving is detected by the voice input device 45 during the autonomous driving control mode, the mode switch unit 63 also cancels the autonomous driving control mode and switches the control unit to the manual driving control mode.

The mode switch unit 63 outputs the autonomous driving controlled variable θad during the autonomous driving control mode. In the present embodiment, switching to the autonomous driving control mode means switching to the state in which the autonomous driving controlled variable θad is output. The steering control device 1 thus controls the activation of the steering motor 32 using the target steering corresponding angle θpg* reflecting the autonomous driving controlled variable θad. That is, the autonomous driving control mode is a mode in which the autonomous driving controlled variable θad for implementing autonomous driving is reflected in the control for activating the steering unit 5.

On the other hand, the mode switch unit 63 does not output the autonomous driving controlled variable θad during the manual driving control mode. In the present embodiment, switching to the manual driving control mode means switching to the state in which the autonomous driving controlled variable θad is not output. The steering control device 1 thus controls the activation of the steering motor 32 using the target steering corresponding angle θpg* not reflecting the autonomous driving controlled variable θad. That is, the manual driving control mode is a mode in which the autonomous driving controlled variable θad for implementing autonomous driving is not reflected in the control for activating the steering unit 5.

(Operation Conditions)

The mode switch unit 63 determines that the operation conditions are satisfied when the following conditions are satisfied.

(a1) The operation invalid switch 14 is in the off state.

(a2) The lever operation is not determined to be a specific operation in which a change in lever tilt angle θl of the operating lever 11 appears in such a manner that the change settles down instantly.

(a3) The lever tilt angle θl of the operating lever 11 has changed.

As in (a1), the operation conditions include a condition based on the on/off state of the operation invalid switch 14. The condition based on the on/off state of the operation invalid switch 14 includes an invalid condition that is satisfied when the operation invalid switch 14 is in the on state. In other words, as long as the operation invalid switch 14 is in the off state, that is, as long as the invalid condition is not satisfied, the mode switch unit 63 is in an operation allowing state in which the mode switch unit 63 determines the lever operation to be valid and allows the operation conditions to be satisfied. As in (a2) and (a3), the operation conditions include conditions based on the manner in which the lever tilt angle θl of the operating lever 11 changes.

On the other hand, when at least one of the above conditions is not satisfied, the mode switch unit 63 determines that the operation conditions are not satisfied. In other words, regarding the condition (a1), as long as the operation invalid switch 14 is in the on state, that is, as long as the invalid condition is satisfied, the mode switch unit 63 determines the lever operation to be invalid so as not to allow the operation conditions to be satisfied. In the present embodiment, as long as the invalid condition is satisfied, the mode switch unit 63 is in an operation invalid state in which the mode switch unit 63 determines the lever operation to be invalid. Regarding the condition (a2), when the invalid condition is not satisfied but the mode switch unit 63 determines the lever operation to be the specific operation, the mode switch unit 63 determines this operation to be invalid so as not to allow the operation conditions to be satisfied. In the present embodiment, the specific operation is an example of the unintended operation by the driver.

(Specific Operation)

The mode switch unit 63 determines the lever operation to be the specific operation when the following conditions are satisfied.

(b1) The result of smoothing time series data Dt, namely smoothing the result of continuously detecting the value of the lever tilt angle θl that is the amount of operation of the operating lever 11, is equal to or greater than a change threshold Lth. It is herein assumed that the sampling time is the past predetermined unit time from the current time. The time series data Dt is data obtained by continuously detecting the value of the lever tilt angle θl during the sampling time. In the present embodiment, the smoothing method is to calculate a moving average of the values of the lever tilt angle θl for the sampling time. The change threshold Lth is a value in a range in which it can be determined that a change in lever tilt angle θl of the operating lever 11 appears in such a manner that the change settles down instantly. The manner in which the change settles down instantly refers to, for example, a peak-like change that occurs instantaneously.

(b2) An operating speed $\Omega l$ of the operating lever 11 is equal to or greater than a speed threshold ωlth.

The speed threshold ωlth is a value in a range in which it can be determined that the driver has unintentionally touched the operating lever 11. The mode switch unit 63 of the present embodiment calculates the operating speed ωl by differentiation of the lever tilt angle θl. In another embodiment, the operation unit 4 may be provided with a speed sensor, and the operating speed ωl may be detected from the speed sensor.

As in (b1), a condition based on the result of comparing the result of smoothing time series data obtained by continuously detecting the value of the lever tilt angle θl with a threshold is included in order to determine that the lever operation is the specific operation. As in (b2), a condition based on the result of comparing an operation amount parameter indicating the state of change in amount of operation of the operating lever 11 with a threshold is included in order to determine that the lever operation is the specific operation.

(Process of Switching Control Mode by Operation of Operating Lever)

An example of a processing procedure in which the mode switch unit 63 switches the control mode according to the lever operation during the autonomous driving control mode will be described with reference to the flowchart of FIG. 3.

As shown in the figure, the mode switch unit 63 determines whether the control mode is the autonomous driving control mode (step 101). When the autonomous driving controlled variable θad is not input to the mode switch unit 63 and the mode switch unit 63 therefore determines that the control mode is not the autonomous driving control mode (step 101: NO), the process ends.

On the other hand, when the autonomous driving controlled variable θad is input to the mode switch unit 63 and the mode switch unit 63 therefore determines that the control mode is the autonomous driving control mode (step 101: YES), the mode switch unit 63 acquires the operation invalid switch information Ss (step 102). The mode switch unit 63 then determines whether the invalid condition is satisfied, based on the operation invalid switch information Ss (step 103). In step 103, the mode switch unit 63 determines whether the operation invalid switch 14 is in the on state, based on the operation invalid switch information Ss.

When the operation invalid switch information Ss indicates the on state and the mode switch unit 63 therefore determines that the invalid condition is satisfied (step 103: YES), the process ends. In this case, since the invalid condition is satisfied, the mode switch unit 63 determines the lever operation to be invalid.

On the other hand, when the operation invalid switch information Ss indicates the off state and the mode switch unit 63 therefore determines that the invalid condition is not satisfied (step 103: NO), the mode switch unit 63 acquires the lever tilt angle θl (step 104). Thereafter, the mode switch unit 63 analyzes the time series data Dt of the acquired values of the lever tilt angle θl (step 105). In step 105, the mode switch unit 63 calculates a moving average for the sampling time based on the time series data Dt. Subsequently, the mode switch unit 63 determines whether the specific operation is detected (step 106). In step 106, the mode switch unit 63 determines whether the value of the moving average obtained based on the time series data Dt is equal to or greater than the change threshold Lth. In step 106, the mode switch unit 63 also calculates the operating speed ωl, and determines whether the operating speed ωl is equal to or greater than the speed threshold ωlth.

When the value of the moving average obtained based on the time series data Dt is equal to or greater than the change threshold Lth and the operating speed ωl is equal to or greater than the speed threshold ωlth, and the mode switch unit 63 therefore determines that the conditions (b1) and (b2) are satisfied, namely determines that the lever operation is the specific operation (step 106: YES), the process ends. In this case, although the invalid condition is not satisfied, the mode switch unit 63 determines that this lever operation determined to be the specific operation is invalid.

On the other hand, when the value of the moving average obtained based on the time series data Dt is less than the change threshold Lth or the operating speed ωl is less than the speed threshold ωlth, and the mode switch unit 63 therefore determines that the condition (b1) or (b2) is not satisfied, namely determines that the lever operation is not the specific operation (step 106: NO), the mode switch unit 63 determines whether the operation conditions are satisfied (step 107). In step 107, the mode switch unit 63 determines, based on the lever tilt angle θl acquired in step 104, whether the lever tilt angle θl has changed. In this case, the mode switch unit 63 determines whether the current value of the lever tilt angle θl acquired in the current cycle has changed from the previous value of the lever tilt angle θl acquired in the immediately preceding cycle (one cycle before). When the mode switch unit 63 proceeds to step 107, both of the condition (a1) that the invalid condition is not satisfied (step 103: NO) and the condition (a2) that the lever operation is not the specific operation (step 106: NO) are satisfied.

When the lever tilt angle θl has not changed and the mode switch unit 63 therefore determines that the condition (a3) is not satisfied, that is, when the mode switch unit 63 determines that the operation conditions are not satisfied (step 107: NO), the process ends.

On the other hand, when the lever tilt angle θl has changed and the mode switch unit 63 therefore determines that the condition (a3) is satisfied, that is, when the mode switch unit 63 determines that the operation conditions are satisfied (step 107: YES), the mode switch unit 63 cancels the autonomous driving control mode and switches the control mode to the manual driving control mode (step 108). In step 108, the mode switch unit 63 performs processing so as not to output the autonomous driving controlled variable θad thereafter, regardless of whether the autonomous driving controlled variable θad is input to the mode switch unit 63. The process of step 107 corresponds to the operation determination process, and the process of step 108 corresponds to the mode switching process.

(Process of Switching Control Mode by Voice Input)

An example of a processing procedure in which the mode switch unit 63 switches the control mode according to a voice input during the autonomous driving control mode will be described with reference to the flowchart of FIG. 4.

As shown in the figure, the mode switch unit 63 determines whether a voice input provided by the driver is detected (step 111). When the detection signal Sem is not input to the mode switch unit 63 and the mode switch unit 63 therefore determines that no voice input is detected (step 111: NO), the process ends.

On the other hand, when the detection signal Sem is input to the mode switch unit 63 and the mode switch unit 63 therefore determines that a voice input is detected (step 111: YES), the mode switch unit 63 determines whether the control mode is the autonomous driving control mode (step 112). Thereafter, when the autonomous driving controlled variable θad is not input to the mode switch unit 63 and the mode switch unit 63 therefore determines that the control mode is not the autonomous driving control mode (step 112: NO), the process ends.

When the autonomous driving controlled variable θad is input to the mode switch unit 63 and the mode switch unit 63 therefore determines that the control mode is the autonomous driving control mode (step 112: YES), the mode switch unit 63 cancels the autonomous driving control mode and switches the control mode to the manual driving control mode (step 113). In step 113, the mode switch unit 63 switches the control mode from the autonomous driving control mode to the manual driving mode regardless of whether the conditions (a1) to (a3) are satisfied.

Next, the functions and effects of the present embodiment will be described.

(1-1) The mode switch unit 63 performs the operation determination process of determining whether the operation conditions for detecting a valid lever operation is satisfied during the autonomous driving control mode. The operation determination process includes the process of determining the specific operation to be invalid so that the operation conditions will not be satisfied by an unintended lever operation by the driver. Accordingly, when the driver unintentionally touches the operating lever 11, this unintended lever operation by the driver is less likely to be valid. This is particularly effective in the steering system 2 configured so that the angle ratio α is greater than 1. Therefore, the control mode is less likely to be switched from the autonomous driving control mode to the manual driving control mode due to an unintended lever operation by the driver during the autonomous driving control mode.

(1-2) The operation determination process includes the process of determining whether the invalid condition is satisfied. Accordingly, in the operation determination process, the lever operation can be determined to be invalid when the invalid condition is satisfied. It is therefore possible to easily implement the configuration in which an unintended lever operation by the driver is determined to be invalid.

(1-3) The operation determination process includes the process of determining that the specific operation, namely an instantaneous operation by the driver, to be invalid. The instantaneous operation may have occurred because, for example, the driver unintentionally touched the operating lever 11. This is effective in appropriately detecting an unintended operation out of lever operations by the driver.

(1-4) The mode switch unit 63 detects the specific operation based on the result of comparing the result of smoothing the time series data Dt, namely smoothing the result of continuously detecting the lever tilt angle θ1 that is the amount of operation of the operating lever 11, with the change threshold Lth. This is effective in appropriately detecting an instantaneous operation as the specific operation.

(1-5) The mode switch unit 63 detects the specific operation based on the result of comparing the operating speed ωl indicating the state of change in amount of operation of the operating lever 11 with the speed threshold ωlth. This is effective in appropriately detecting an instantaneous operation as the specific operation.

Another Embodiment of First Embodiment

Another embodiment of the first embodiment of the steering control device will be described below. The mode switch unit 63 of the present embodiment is configured to include a process of, when detecting the specific operation, measuring an operation time Ts that is a time period during which the position of the operating lever 11 does not match the straight ahead position, instead of the time series data Dt in each of the above embodiments.

Specifically, as a process corresponding to step 105, the mode switch unit 63 calculates the operation time Ts. As a process corresponding to step 106, the mode switch unit 63 determines whether the operation time Ts is less than a time threshold Tth.

When the operation time Ts is less than the time threshold Tth, the mode switch unit 63 can determine that the specific operation is detected (step 106: YES). When the operation time Ts is equal to or greater than the time threshold Tth, the mode switch unit 63 can determine that the specific operation is not detected (step 106: NO).

According to the present embodiment, this is effective in appropriately detecting an instantaneous operation as the specific operation, like the above effect (1-4).

Second Embodiment

A second embodiment of the steering control device will be described below with reference to the drawings. For convenience of description, the same configurations as those in the first embodiment are denoted by the same signs as those in the first embodiment, and description thereof will be omitted.

As shown by a long dashed double-short dashed line in FIG. 1, the operation unit 4 includes a pressure sensor 15 that detects gripping of the operating lever 11 by the driver, instead of the operation invalid switch 14 of the first embodiment. The pressure sensor 15 is used to make the lever operation valid, as will be described later. In the present embodiment, the lever operation is made valid when the pressure sensor 15 detects gripping of the operating lever 11 by the driver.

As shown by parentheses in FIG. 2, the pressure sensor 15 outputs pressure sensor information Sst indicating the on/off state of the pressure sensor 15 to the steering control device 1, instead of the operation invalid switch information Ss of the first embodiment. The pressure sensor 15 of the present embodiment is a sensor that detects the on/off state according to whether the driver grips the operating lever 11 and touches a detection unit of the pressure sensor 15. The pressure sensor 15 detects the on state when the driver grips the operating lever 11 and touches the detection unit of the pressure sensor 15. When the pressure sensor 15 is in the on state, it can be detected that a lever operation, if any, is an intended operation by the driver. The pressure sensor 15 detects the off state when the driver does not grip the operating lever 11 and does not touch the detection unit of the pressure sensor 15. When the pressure sensor 15 is in the off state, it can be detected that a lever operation, if any, is an unintended operation by the driver. The pressure sensor 15 is mounted on, for example, the operating lever 11.

(Operation Conditions)

The operating conditions of the present embodiment include (a1r) instead of (a1) of the first embodiment. The operating conditions of the present embodiment include (a2) and (a3) of the first embodiment. That is, the operating conditions of the present embodiment are (a1r), (a2), and (a3).

Specifically, the condition (a1r) is that the pressure sensor 15 is in the on state. Like (a1r), the operation conditions include a condition based on the on/off state of the pressure sensor 15. The condition based on the on/off state of the pressure sensor 15 includes a setting condition that is satisfied when the pressure sensor 15 is in the on state. That is, when the pressure sensor 15 is in the on state, that is, when the setting condition is satisfied, the mode switch unit 63 is in an operation allowing state in which the mode switch unit 63 determines the lever operation to be valid and allows the operation conditions to be satisfied.

On the other hand, when the above condition is not satisfied, the mode switch unit 63 determines that the operation conditions are not satisfied. In other words, regarding the condition (a1r), when the pressure sensor 15 is in the off state, that is, when the setting state is not satisfied, the mode switch unit 63 determines the lever operation to be invalid so as not to allow the operation conditions to be satisfied. In the present embodiment, when the setting condition is not satisfied, the mode switch unit 63 is in an operation invalid state in which the mode switch unit 63 determines an unintended lever operation by the driver to be invalid. Regarding the condition (a2), when the pressure sensor 15 is in the on state and the setting condition is satisfied but the mode switch unit 63 determines the lever operation to be the specific operation, the mode switch unit 63 determines this operation to be invalid so as not to allow the operation conditions to be satisfied.

(Process of Switching Control Mode by Operation of Operating Lever)

Figure 5:
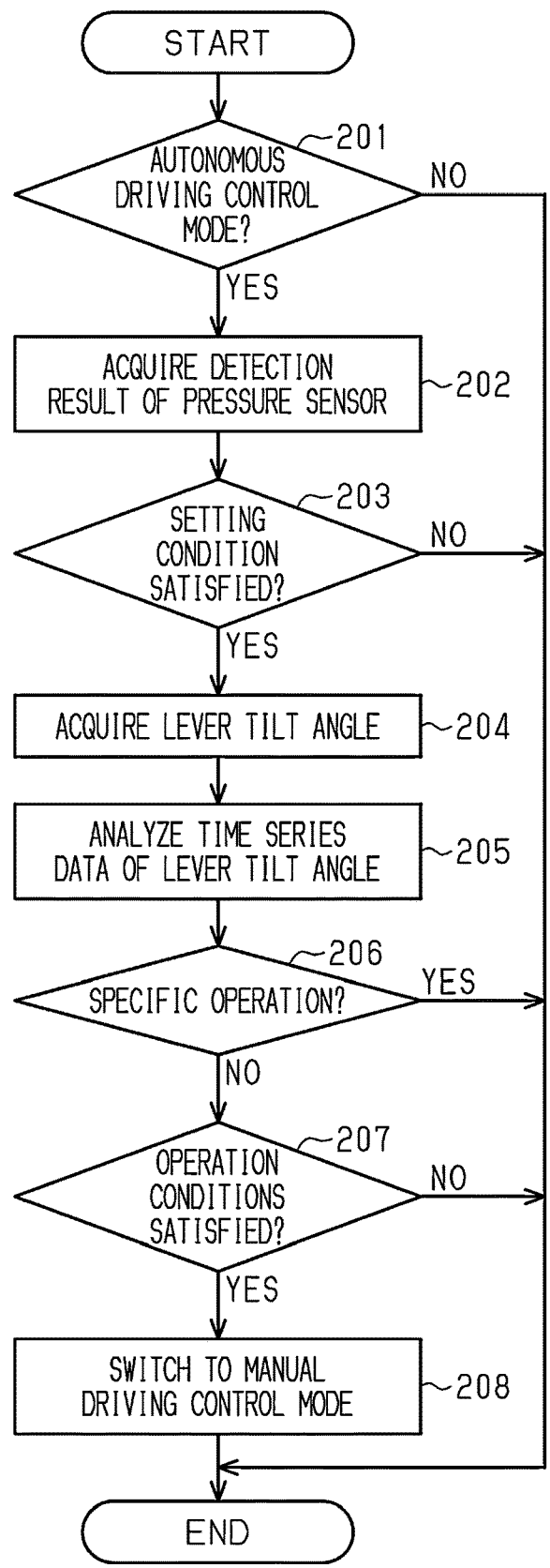
FIG. 5 is a flowchart showing an example of a processing procedure that is performed by the mode switch unit in FIG. 2 according to a second embodiment.

An example of a processing procedure in which the mode switch unit 63 switches the control mode according to the lever operation during the autonomous driving control mode will be described with reference to the flowchart of FIG. 5.

As shown in the figure, the mode switch unit 63 determines whether the control mode is the autonomous driving control mode (step 201). In step 201, the mode switch unit 63 performs the same process as in step 101 of FIG. 3. When the autonomous driving controlled variable θad is not input to the mode switch unit 63 and the mode switch unit 63 therefore determines that the control mode is not the autonomous driving control mode (step 201: NO), the process ends.

On the other hand, when the autonomous driving controlled variable θad is input to the mode switch unit 63 and the mode switch unit 63 therefore determines that the control mode is the autonomous driving control mode (step 201: YES), the mode switch unit 63 acquires the pressure sensor information Sst (step 202). The mode switch unit 63 then determines whether the setting condition is satisfied, based on the pressure sensor information Sst (step 203). In step 203, the mode switch unit 63 determines whether the pressure sensor 15 is in the on state, based on the pressure sensor information Sst.

When the pressure sensor information Sst indicates the off state and the mode switch unit 63 therefore determines that the setting condition is not satisfied (step 203: NO), the process ends. In this case, since the pressure sensor 15 is in the off state, the mode switch unit 63 determines the lever operation to be invalid.

On the other hand, when the pressure sensor information Sst indicates the on state and the mode switch unit 63 therefore determines that the setting condition is satisfied (step 203: YES), the mode switch unit 63 acquires the lever tilt angle θl (step 204). Thereafter, the mode switch unit 63 analyzes the time series data Dt of the acquired lever tilt angle θl (step 205). In step 205, the mode switch unit 63 performs the same process as in step 105 of FIG. 3.

Subsequently, the mode switch unit 63 determines whether the specific operation is detected (step 206). In step 206, the mode switch unit 63 performs the same process as in step 106 of FIG. 3. When the mode switch unit 63 determines that the lever operation is the specific operation (step 206: YES), the process ends. In this case, although the setting condition is satisfied, the mode switch unit 63 determines that this lever operation determined to be the specific operation is invalid.

On the other hand, when the mode switch unit 63 determines that the lever operation is not the specific operation (step 206: NO), the mode switch unit 63 determines whether the operation conditions are satisfied (step 207). In step 207, the mode switch unit 63 performs the same process as in step 107 of FIG. 3. When the mode switch unit 63 determines that the operation conditions are not satisfied (step 207: NO), the process ends.

On the other hand, when the mode switch unit 63 determines that the operation conditions are satisfied (step 207: YES), the mode switch unit 63 cancels the autonomous driving control mode and switches the control mode to the manual driving control mode (step 208). In step 208, the mode switch unit 63 performs the same process as in step 108 of FIG. 3.

The present embodiment has the following functions and effects. (2-1) The operation determination process includes the process of determining whether the setting condition is satisfied. Accordingly, in the operation determination process, the lever operation can be determined to be invalid when the setting condition is not satisfied. It is therefore possible to easily implement the configuration in which an unintended lever operation by the driver is determined to be invalid.

Other Embodiments

Each of the above embodiments can be modified as follows. The above embodiments and the following modifications can be combined as long as no technical contradiction arises.

In the first embodiment, the configuration of the operation invalid switch 14 may be omitted. In this case, the process of step 103 may be omitted from the process of FIG. 3.

In the first embodiment, the configuration of the pressure sensor 15 of the second embodiment may be added. In this case, a process corresponding to step 203 in FIG. 5 may be added before or after the process of step 103 in the process of FIG. 3.

In the first embodiment, the type of the operation invalid switch 14 may be changed as appropriate to, for example, a touch sensor type.

Figure 3:
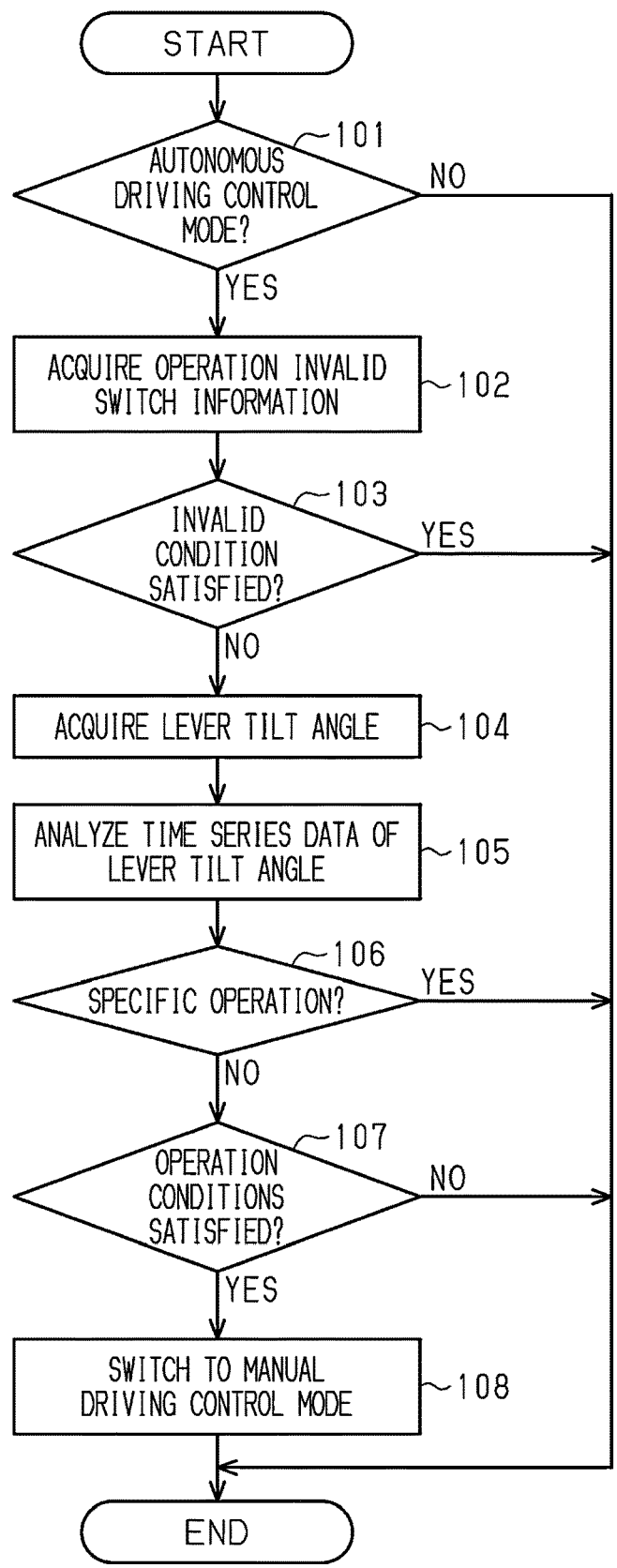
FIG. 3 is a flowchart showing an example of a processing procedure that is performed by a mode switch unit in FIG. 2 to switch a control mode according to an operation of an operating lever, according to a first embodiment.
Figure 4:
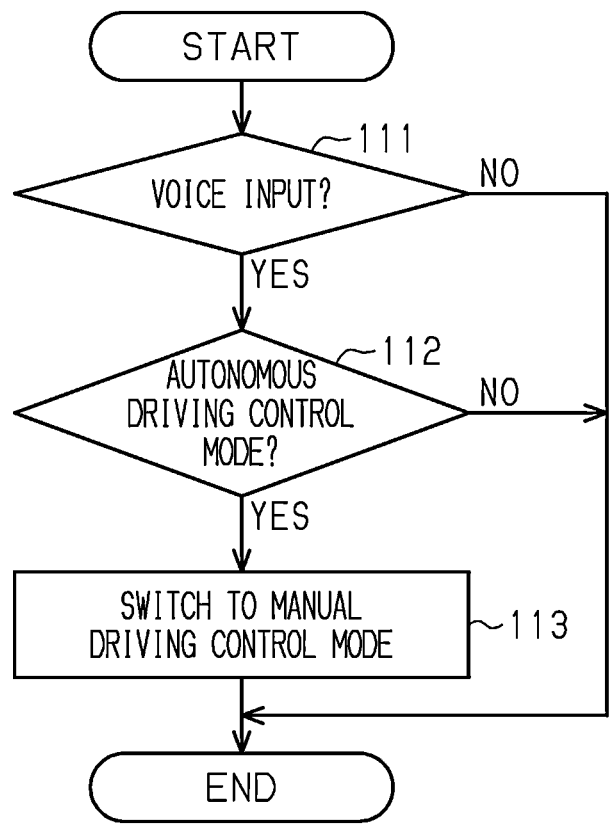
FIG. 4 is a flowchart showing an example of a processing procedure that is performed by the mode switch unit in FIG. 2 to switch the control mode according to a voice input.

In the first embodiment, the processing procedures performed by the mode switch unit 63 are not limited to those shown in FIGS. 3 and 4, and may be changed as appropriate. For example, the process of step 101 in FIG. 3 may be configured to be performed after the process of step 107: YES. The same applies to the second embodiment. That is, the process of step 201 in FIG. 5 may be configured to be performed after the process of step 207: YES.

In the first embodiment, the process of step 106 in FIG. 3 may be omitted from the process performed by the mode switch unit 63. The same applies to the second embodiment. That is, the process of step 206 in FIG. 5 may be omitted.

In the second embodiment, the configuration of the pressure sensor 15 may be omitted. In this case, the process of step 203 may be omitted from the process of FIG. 5.

In the second embodiment, the type of the pressure sensor 15 may be changed as appropriate to, for example, a type that switches between the on and off states according to whether the operating lever 11 is gripped and the lever is pressed.

In each of the above embodiments, when detecting the specific operation, the mode switch unit 63 may use a different element instead of the operating speed ωl or may use other elements in combination. Possible examples of such different and other elements include, for example, an operation acceleration that is the rate of change in operating speed ωl, the steering corresponding angle θp, and a steering speed that is the rate of change in steering corresponding angle θp. Other example of such other elements may be the driver's operating force on the operating lever 11. For example, the operating lever 11 may be provided with a torque sensor that detects the operating force applied to the operating lever 11 by the driver.

In each of the above embodiments, the mode switch unit 63 may determine that the specific operation is detected when either the condition (b1) or (b2) is satisfied.

In each of the above embodiments, when detecting the specific operation, the mode switch unit 63 may use only the condition (b1) and the condition (b2) may be omitted, or the mode switch unit 63 may use only the condition (b2) and the condition (b1) may be omitted.

In each of the above embodiments, when detecting the specific operation, the mode switch unit 63 may use both the time series data Dt and the operation time Ts that is the time period during which the position of the operating lever 11 does not match the straight ahead position.

In each of the above embodiments, the value of the change threshold Lth may be changed according to the operation to be detected as the specific operation. For example, such an operation that a change in lever operation by the driver settles down in a shorter or longer period of time can be detected as the specific operation. The same applies to the time threshold Tth or the speed threshold $\omega$lth.

In each of the above embodiments, the change threshold Lth may be changed according to the traveling state of the vehicle, such as the vehicle speed V. The same applies to the time threshold Tth or the speed threshold $\omega$lth.

In each of the above embodiments, the autonomous driving control device 44 may generate, as the autonomous driving controlled variable $\theta$ad, a torque controlled variable having a torque dimension. In this case, the torque controlled variable having a torque dimension may be converted into a value having an angle dimension and then reflected in the steered angle $\theta$i.

In each of the above embodiments, autonomous driving may be implemented not only as a function to take over driving while the vehicle is traveling, but also as a function to provide various driver assistance functions to further improve the comfort of the vehicle. Possible examples of the driver assistance functions include functions to prevent the vehicle from departing its lane and to assist in emergency avoidance.

In each of the above embodiments, the configuration of the voice input device 45 may be omitted. In this case, the process in FIG. 4 may be omitted.

In each of the above embodiments, the emergency request means for canceling autonomous driving may be modified as appropriate. For example, a switch that is operated by the driver may be provided instead of the voice input device 45.

In each of the above embodiments, the steering corresponding angle calculation unit 61 may be omitted. In this case, for example, the steering corresponding angle $\theta$p that is the rotation angle of the pinion shaft 21 may be input from a sensor that detects this rotation angle. This sensor may detect the rotation angle of the pinion shaft 21 as an absolute angle exceeding the range of 360°.

In each of the above embodiments, when the reaction force mechanism 12a is composed of a motor, the lever tilt angle $\theta$l may be detected based on the rotation angle of the motor.

In each of the above embodiments, the convertible value that can be converted into the steered angle $\theta$i of the steered wheels 3 is the rotation angle of the pinion shaft 21. However, the convertible value is not limited to this, and may be, for example, the stroke amount of the rack shaft 22, or the steered angle $\theta$i itself.

In each of the above embodiments, the operating lever 11 is tiltably supported by the base 12. However, the operating lever 11 is not limited to this, and may be supported so as to be slidable relative to the base 12. In this case, the amount of operation by the driver is represented by the amount of sliding of the operating lever 11. The operating lever 11 may be used to control driving/braking of the vehicle, in addition to controlling the steered angle $\theta$i of the steered wheels 3.

In each of the above embodiments, the operation unit 4 may include, as an operating member, a steering wheel that is operated by the driver, instead of the operating lever 11. In this case, the operation unit 4 may include the steering wheel in addition to the operating lever 11. The steering system 2 has a linkless structure in which power transmission between the operation unit 4 and the steering unit 5 is separated. However, the steering system 2 is not limited to this. When the steering wheel is included, the steering system 2 may have a structure in which power transmission between the operation unit 4 and the steering unit 5 can be separated by a clutch.

In each of the above embodiments, the steering actuator 31 transmits rotation of the steering motor 32 to the ball screw mechanism 35 via the belt mechanism 34. However, the steering actuator 31 is not limited to this. For example, the steering actuator 31 may be configured to transmit rotation of the steering motor 32 to the ball screw mechanism 35 via a gear mechanism. Alternatively, the steering actuator 31 may be configured to directly rotate the ball screw mechanism 35 by the steering motor 32. Alternatively, the steering unit 5 may include a second rack and pinion mechanism, and the steering actuator 31 may be configured to apply a steering force to the steering unit 5 by converting rotation of the steering motor 32 into a reciprocating motion of the rack shaft 22 by the second rack and pinion mechanism.

The invention claimed is:

1. A steering control device that controls a steering system of a vehicle, the steering system having a structure in which a power transmission path between an operation unit including an operating member and a steering unit configured to steer a steered wheel is separated, the steering control device comprising:
    a target steering corresponding value calculation unit configured to calculate, based on an operation of the operating member, a target steering corresponding value that is a target value of a convertible value that is convertible into a steered angle of the steered wheel, and to calculate the target steering corresponding value in such a manner that a ratio of an amount of change in the steered angle to an amount of change in an amount of operation of the operating member becomes greater than 1;
    a control signal generation unit configured to generate, based on the target steering corresponding value, a control signal for activating the steering unit; and
    a mode switch unit that switches a control mode in which the steering unit is activated to an autonomous driving control mode or a manual driving control mode, wherein
    the vehicle includes an external control device that outputs an autonomous driving instruction to implement autonomous driving for autonomously changing a direction of travel of the vehicle,
    the autonomous driving control mode is a mode in which the autonomous driving instruction is reflected in a control for activating the steering unit,
    the manual driving control mode is a mode in which the autonomous driving instruction is not reflected in the control for activating the steering unit,
    the mode switch unit is configured to perform
        an operation determination process of determining whether an operation condition for detecting a valid operation performed on the operating member by a driver is satisfied during the autonomous driving control mode, and a mode switching process of switching the control mode from the autonomous driving control mode to the manual driving control mode when the operation condition is satisfied, and the operation determination process includes a process of determining whether a mode state condition that the control mode is the autonomous driving control mode is satisfied, a process of determining, at least on a condition that the mode state condition is satisfied, whether an operation state condition is satisfied, the operation state condition being a condition that a state for detecting the valid operation performed on the operating member by the driver is established, and the process being a process of determining whether the operation state condition is satisfied based on a condition different from an operation performed on the operating member by the driver, a process of determining the operation by the driver to be invalid, at least on a condition that the mode state condition is satisfied and that the operation state condition is not satisfied, and a process of determining an unintended operation by the driver to be invalid, at least on a condition that the mode state condition is satisfied and the operation state condition is satisfied.

2. The steering control device according to claim 1, wherein:

the operation state condition is a condition that is satisfied when an invalid condition is not satisfied, the invalid condition being a condition that is satisfied under a condition different from the operation performed on the operating member by the driver; and the operation determination process includes a process of determining the operation by the driver to be invalid, at least on a condition that the mode state condition is satisfied and that the invalid condition is satisfied and therefore the operation state condition is not satisfied, and a process of determining whether the operation condition is satisfied, at least on a condition that the mode state condition is satisfied and that the invalid condition is not satisfied and therefore the operation state condition is satisfied.

3. The steering control device according to claim 1, wherein:

the operation state condition is a condition that is satisfied when a setting condition is satisfied, the setting condition being a condition that is satisfied under a condition different from the operation performed on the operating member by the driver; and the operation determination process includes a process of determining whether the operation condition is satisfied, at least on a condition that the mode state condition is satisfied and that the setting condition is satisfied and therefore the operation state condition is satisfied, and a process of determining the operation by the driver to be invalid, at least on a condition that the mode state condition is satisfied and that the setting condition is not satisfied and therefore the operation state condition is not satisfied.

4. The steering control device according to claim 1, wherein the operation determination process includes a process of determining a specific operation to be invalid, at least on a condition that the mode state condition is satisfied and that the operation state condition is satisfied, the specific operation being an operation that appears in such a manner that a change in the operation by the driver settles down instantly.

5. The steering control device according to claim 4, wherein the operation determination process includes a process of analyzing time series data that is a result of continuously detecting the amount of operation of the operating member, and a process of detecting the specific operation based on a result of analyzing the time series data.

6. The steering control device according to claim 5, wherein:

the process of analyzing the time series data includes a process of smoothing the time series data; and the process of detecting the specific operation includes a process of detecting the specific operation based on a result of comparing a result of the smoothing with a threshold.

7. The steering control device according to claim 4, wherein:

the operation determination process includes a process of measuring a time during which the amount of operation of the operating member does not match a straight ahead position that is a position corresponding to a state in which the vehicle travels straight, and a process of detecting the specific operation based on a result of measuring the time; and the process of detecting the specific operation includes a process of detecting the specific operation based on a result of comparing the result of measuring the time with a threshold.

8. The steering control device according to claim 5, wherein the process of detecting the specific operation includes a process of detecting the specific operation based on a result of comparing an operation amount parameter indicating a state of change in the amount of operation with a threshold.

9. A steering control method for controlling a steering system of a vehicle, the steering system having a structure in which a power transmission path between an operation unit including an operating member and a steering unit configured to steer a steered wheel is separated, the steering control method comprising:

calculating, based on an operation of the operating member, a target steering corresponding value that is a target value of a convertible value that is convertible into a steered angle of the steered wheel, and calculating the target steering corresponding value in such a manner that a ratio of an amount of change in the steered angle to an amount of change in an amount of operation of the operating member becomes greater than 1;

generating, based on the target steering corresponding value, a control signal for activating the steering unit; and switching a control mode in which the steering unit is activated to an autonomous driving control mode or a manual driving control mode, wherein the vehicle includes an external control device that outputs an autonomous driving instruction to implement autonomous driving for autonomously changing a direction of travel of the vehicle, the autonomous driving control mode is a mode in which the autonomous driving instruction is reflected in a control for activating the steering unit, the manual driving control mode is a mode in which the autonomous driving instruction is not reflected in the control for activating the steering unit, switching the control mode includes performing an operation determination process of determining whether an operation condition for detecting a valid operation performed on the operating member by a driver is satisfied during the autonomous driving control mode, and a mode switching process of switching the control mode from the autonomous driving control mode to the manual driving control mode when the operation condition is satisfied, and the operation determination process includes performing a process of determining whether a mode state condition that the control mode is the autonomous driving control mode is satisfied, a process of determining, at least on a condition that the mode state condition is satisfied, whether an operation state condition is satisfied, the operation state condition being a condition that a state for detecting the valid operation performed on the operating member by the driver is established, and the process being a process of determining whether the operation state condition is satisfied based on a condition different from an operation performed on the operating member by the driver, a process of determining the operation by the driver to be invalid, at least on a condition that the mode state condition is satisfied and that the operation state condition is not satisfied, and a process of determining an unintended operation by the driver to be invalid, at least on a condition that the mode state condition is satisfied and the operation state condition is satisfied.

\* \* \* \* \*